United States Patent [19]

Benmussa

[11] Patent Number: 4,510,919
[45] Date of Patent: Apr. 16, 1985

[54] SELF HEATING RECEPTACLE

[76] Inventor: Simon Benmussa, 94 Bd - Pape Jean XXIII, 06300 Nice, France

[21] Appl. No.: 439,409

[22] Filed: Nov. 5, 1982

[51] Int. Cl.³ .................................................. F24J 1/00
[52] U.S. Cl. ..................................... 126/263; 126/246
[58] Field of Search ............... 126/246, 263, 262, 261; 206/219, 603, 222, 530; 252/70; 220/201, 353; 426/109, 113, 114, 394, 398, 407; 122/21; 229/10

[56] References Cited

U.S. PATENT DOCUMENTS

| 1,751,387 | 3/1930 | Bielek | 126/263 |
| 2,907,173 | 10/1959 | Robbins | 126/263 X |
| 3,509,870 | 5/1970 | Sheppard | 431/277 X |
| 3,804,077 | 4/1974 | Williams | 126/263 |
| 3,871,357 | 3/1975 | Grosso et al. | 126/263 |

FOREIGN PATENT DOCUMENTS

| 536731 | 12/1955 | Italy | 426/109 |
| 11909 | of 1893 | United Kingdom | 126/246 |
| 946557 | 1/1964 | United Kingdom | 126/263 |

Primary Examiner—Randall L. Green
Attorney, Agent, or Firm—Young & Thompson

[57] ABSTRACT

A self heating receptacle is disclosed comprising a support member having one or a plurality of chambers or indentations thereon where food can be disposed. An opening is disposed on the side of the support member which allows a vessel containing chemical products which react exothermically. The vessel is disposed so that it can be inserted or withdrawn like a drawer. The reactive products can be numerous, such as calcium oxide or quick lime and water, and are separated and packed inside plastic sacks which are water tight. A cutting member having a plurality of cutting projections is disposed at the opening so that when the vessels containing the reactive products is inserted into the opening the sacks are opened and permit the exothermic reaction which provides the heat to heat the food products disposed in the chamber.

3 Claims, 9 Drawing Figures

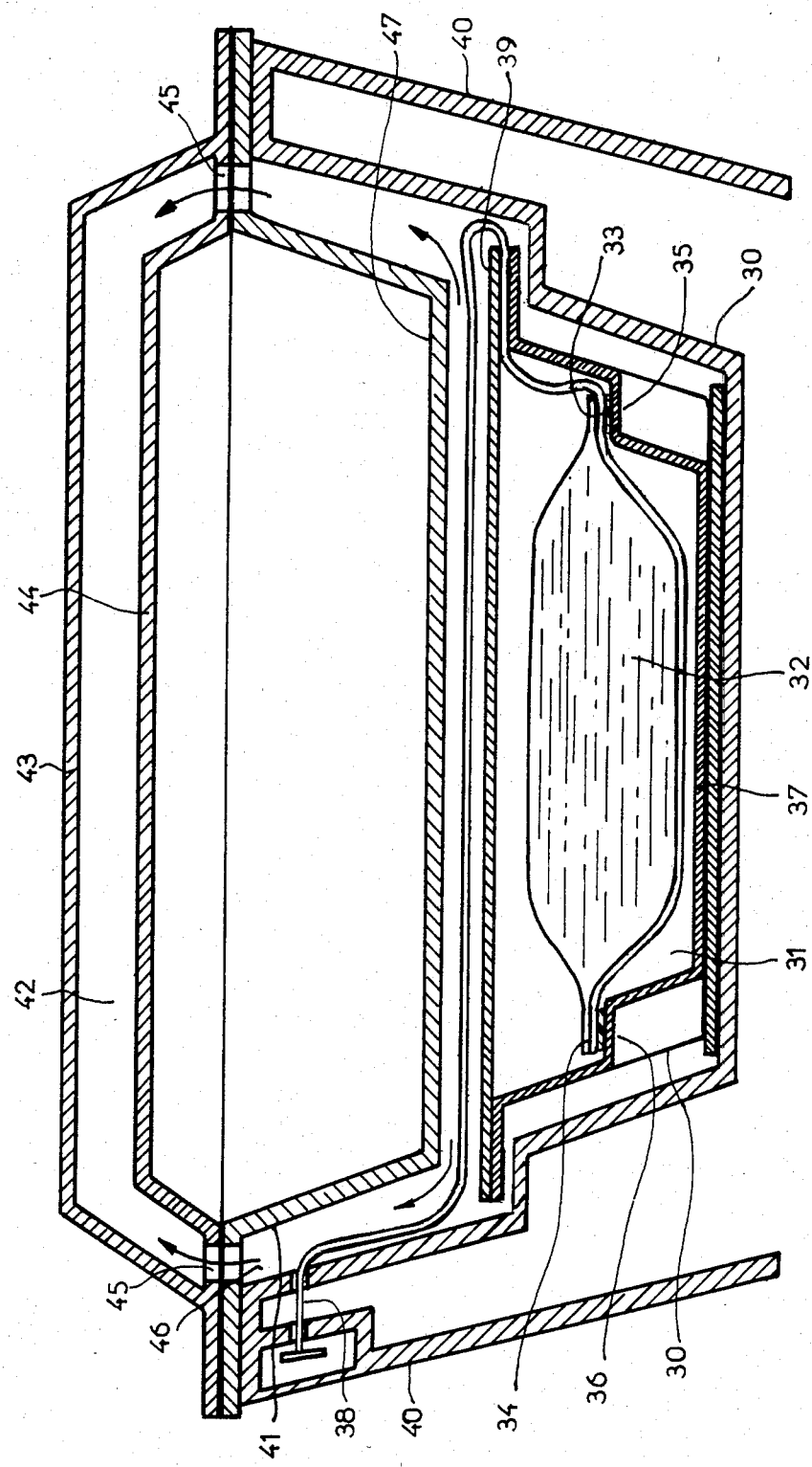

SELF HEATING RECEPTACLE

BACKGROUND OF THE INVENTION

The invention has as an object a receptacle for foods and a method of triggering a chemical reaction for the production of integral heat.

There presently exist a number of receptacles which are self heating. Those receptacles have a number of drawbacks. For example, it is difficult to stock those receptacles for a long time. The reactive products, if not packaged in an effectual manner become inoperative with time, generally after fifty or sixty days. The methods utilized for creating the chemical reaction which produces the heat for warming the foods are more or less effectual.

Generally, in the embodiments of the prior art there are a number of pouches of reactive product, for example calcium oxide or quick lime, or potassium hydroxide and ortho-phosphoric acid or an oxide of calcium or quick lime and a pouch of water. Means are provided to puncture the pouches to permit the reactions. Those pouches are disposed inside an upper part so that it provides a fast exothermic reaction which is rapid but often times limited because of improper mixture between the water and the reactive chemicals.

There are a number of patents which describe self heating receptacles. However, the embodiments described in the prior art have a number of drawbacks, including incomplete reaction of the quick lime and the likelihood of untimely or accidental triggering of the reaction, which can be dangerous. The present invention improves the method by which the reaction is triggered, thereby enhancing the security of the receptacles and assuring a good reaction of all of the quick lime.

The German Pat. No. 1,214,600 discloses a well defined mixture of fruit juices and milk, and consequently does not show the use of a reactive mixture. The device disclosed in U.S. Pat. No. 3,085,681 cannot be used for the uses contemplated by the present invention because of the risks associated with that device. There water is necessarily contained inside an interior pocket, the quick lime cannot be absolutely saturated by the water because of the disposition of two envelopes—thereby providing a incomplete reaction of the quick lime. Additionally, the interior pocket can explode under the pressure of the vapor given off by the quick lime at the moment of reaction, alternately, the vapor will remain trapped and consequently will not heat in some cases the foods in a third container. U.S. Pat. No. 3,871,357 in the plane of opening of the pouch of water only opens just one time out of three or four, because the pouch is free and so are the cutting projections. In commercial applications, as well as in the the patent, the risks associated with the embodiment of the prior art are great, for example, a closing plate on the projections can, if the foods are heavy, cut the vessel that holds them, or burst, when the projections are engaged in an arrested position, and even through it may have little liquid, the reaction will be triggered immediately. When stirring the vessel the pouch of water can break open when it hits the point of projections, thereby uncontrollably triggering a reaction. In French Pat. No. 2,348,121, an adhesive band is provided to hermetically seal a pouch of water. The problem is that as a result of humidity, very high heat, or low temperatures, the adhesive band can be detached; setting off a reaction that would then be uncontrollable. In the French Pat. No. 2,348,121, the pouch of water is fastened at an extremity and a cord, independent of the pouch is disposed in another extremity, that permits a certain movement to the interior of the heating vessel, thereby creating a risk of laceration and of uncontrollable reaction of the reactive chemicals during stocking, transportation or transshipment.

A Swiss process, under the name Pozell, Blanchat, Bertrand, is commercially available and in conception substantially identical with respect to assembly of the vessels, to the assemblies as described in U.S. Pat. No. 2,871,357 and of the previously recited German and American patents, and French Pat. No. 2,348,121 which depends upon the opening of a pouch of water. The latter is hooked at one extremity by a small carton member such a way that the opening cord, all independently of the pouch are, also, hooked at one end to the carton. All the elements can be displaced freely, and without anchoring to the heating vessel—thereby raising the constant dnager that the hooks could perhaps cut or lacerate the vessels carrying the foods. In that event the liquids contained in the food vessel can set off the reaction. The same thing can happen if the heating vessel and the water pouch are pierced which can provoke the chemical reaction at an inopportune moment.

It should also be noted that in all of the above cited references, the quick lime is loose in the interior of the heating vessel—inviting a malfunction such as lack of total reaction, or localized reaction in the vessel, which, therefore, will not permit the perfect heating of the food contained in the upper vessel, or very often, the heating of only one part.

Also, the existing receptacles having a flat water pouch covered almost totally by the heating surface, thus providing a screen for the diffusion of heat to the upper part of the receptacle which contains the food particles.

In the existing receptacles there is an assembly in between the portion containing the food products and the flexible aluminum foil which serves as the heating receptacle in which is incorporated the quick lime and the water pouch. Thence forth the receptacle receives the food products which do not exceed 80 microns because of financial reasons and packaging techniques. As a result of the thinness of the receptacle forced maneuvers by the user which can pierce the bottom of the receptacle which holds the food and also the liquids from the food can provoke a reaction with the quick lime, or if the water pouches burst, the same result will occur.

SUMMARY OF THE INVENTION

The improvements of the present invention are directed to the triggering of a totally controlled reaction, a complete reaction of all the chemical products, and a homogenous heating of the food products.

The self heating receptacle, according to the present invention, consists of a superposition of elements in which is disposed judiciously, the heating vessel which is totally independent. The rigorous requirements of food packaging laws and hygiene are met with those techniques.

The invention has as its goal putting in place all of the guarantees of hygiene and safety to the profit of the user, without as a result losing in efficiency.

The receptacle according to the invention is comprised of a support member having one or a plurality of chambers or indentations for the food products. The chambers can optionally be formed on a food vessel disposed above the support member. A heating vessel for providing a exothermic reaction is mounted on a guide or slide bar in such a manner as to function as a drawer, the action of the drawer in the closed position provokes a reaction and permits the mixture of the reactive product with the water. To that end, the food vessel or support member includes an opening on the side having the guide bar along the interior walls which permit the drawer carrying the reactive product to slide and settle in said support. The reactive products may comprise quick lime and a water pouch. A cutting means, disposed at the entrance of said opening, opens the water pouch and provokes the mixture of reactive products.

The self heating receptacle, according to the present invention, is designed so that the support member or food vessel holds and protects the food. Disposed below the food vessel is the heating vessel, or more accurately, the food vessel is above the heating vessel, that is the vessel that contains the products which are to be reheated. The food carrying receptacle is, preferably, of aluminum foil to have a good contact with the heating receptacle which is below. The pouch which contains the water is a roll or tours which is maintained at its extremities with pads in such a manner that the water pouch is suspended above the bottom, and perhaps a few tenths of a millimeter from the heating vessel. That suspension of the water pouch or roll permits, at the moment of opening a good distribution of the water under the quick lime.

The ripcord has two distinct functions. The first, to open the water pouch to set off or trigger a reaction, and equally to open the flap or lid on the heating vessel to permit the heating of the food contained in the upper vessel.

The invention is equally directed to the novel means for triggering the reaction.

The invention is directed to a disposable vessel and rechargeable vessel. The rechargeable vessel is conceived principally for particular uses (camper, etc.), where the preparation of foods requires constant reheating of entire pieces of meat such as veal cutlet or quiche lorraine, pizzas and others.

BRIEF DESCRIPTION OF THE DRAWINGS

Further details are explained below with the help of the examples in the attached drawings in which:

FIG. 9 is a cross sectional longitudinal view of an assembly of the vessel support for protection of the heating vessel and the food vessel and in addition, a cover for the same.

Thus, the invention disclosed permits the conservation of the reactive product from 13 to 14 months. The means of opening the pouches permits the attainment of a chemical reaction which is progressive and total.

Finally, according to the alternative embodiment of the invention, the receptacle can comprise means which permit it to be rechargeable or alternately, to be disposable.

The water pouch can include a means for controlling the supply of water in such a manner so as to control and eventually stop the reaction.

DETAILED DESCRIPTION OF THE INVENTION

Figure 1:
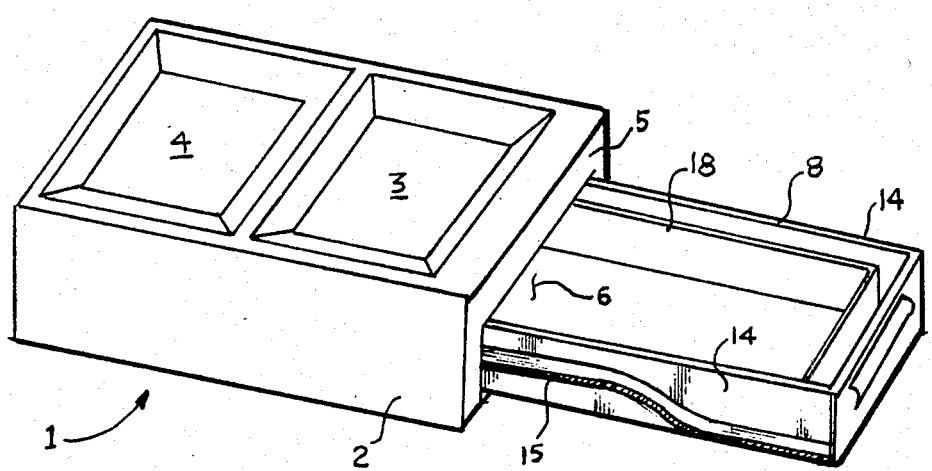
FIG. 1 is a perspective side view of the self heating receptacle according to the present invention.
Figure 2:
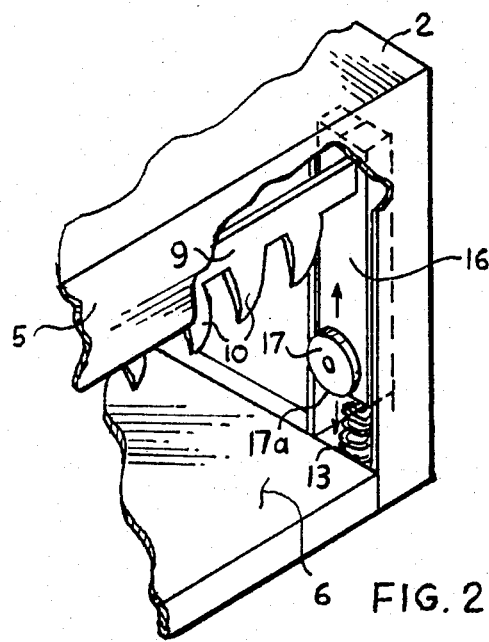
FIG. 2 is a partial and cut away view of the drawer opening of the receptacle of FIG. 1 showing the operation of the means for opening of the reactive pouches.

The receptacle 1, as illustrated in FIG. 1 comprises a support member or food vessel 2 which includes one or a plurality of chambers or indentations 3 and 4. On side 5 of the support member 2 there is disposed an opening 6. The opening 6 allows the insertion of a heating vessel, which contains the products that react exothermically (not shown), which can be inserted or removed as in a drawer 8. The reactive products which can be numerous, for example calcium oxide or quick lime, and water are separated in their containers with impermeable plastic pouches. At the entrance 6 is disposed a cutting means 9 as best seen in FIG. 2, a strip having a plurality of projections 10 which upon the insertion of the above mentioned pouches, (in the drawer 8) allow the pouches to be opened and permit the mixture of reactive products to react chemically in an exothermic reaction, and provide the heat to the food products disposed in the indentations 3 and 4. The drawer 8 contains on the sides 14 a guiding ramp 15 which engages a friction roller 17 which is part of a vertically movable piece 16 which is attached to cutting means 9. Piece 16 moves in channel 17a as roller 17 is moved vertically by ramp 15. As will be noted, piece 16 is biased upward by spring 13. Thus, when the drawer 8 is completely disengaged of its support member 2 the projections 10 of the strip 9 are not visible. When the drawer 8 is inserted into the opening 6, the ramps 15 works the friction rollers 17 which cause the cutting means to move downwards.

The user disposes a recharge of reactive chemicals in the space inside the drawer 8, or on a heating vessel or receptacle 18. When drawer 8 is pushed closed, rollers 17, riding on ramps 15, move downward, forcing strip 9 and projections 10 into the pouches of reactive chemicals in drawer 8 or vessel 18, opening same. After use, the expended chemicals may be removed and the unit reused by recharging with fresh reactive chemicals.

Figure 3:
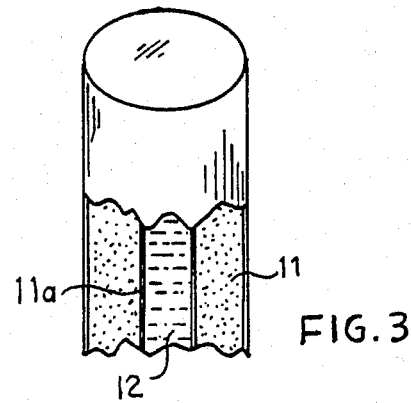
FIG. 3 is a cross sectional view of a container for the reactive product.

Shown in FIG. 3, is a cross sectional view of a sack containing the reactive products in their respective compartments, and in the specific embodiment is shown a compartment 11 containing calcium oxide, which is disposed on the periphery of the sack and at the center a compartment 12 containing water. The water in compartment 12 is separated from the quick lime by an impermeable pouch 11(a).

Figure 4:
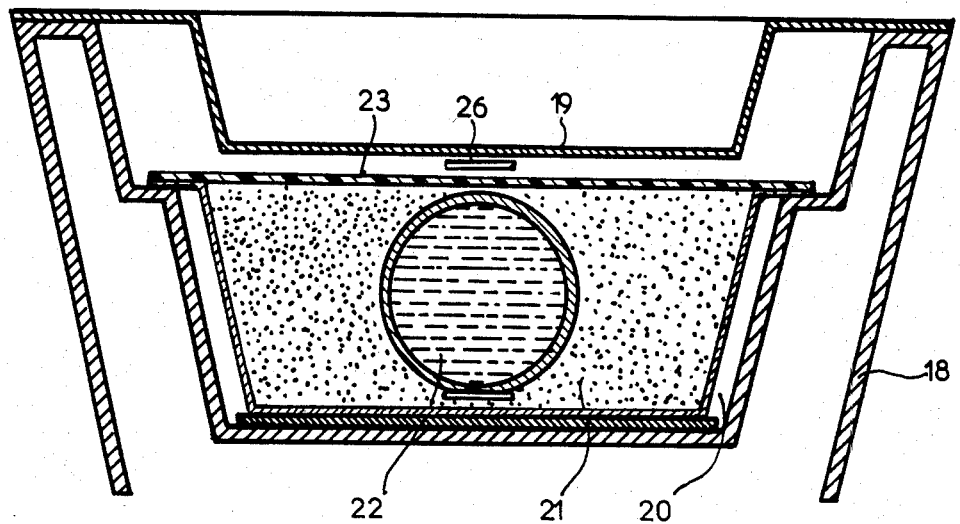
FIG. 4 is a cross sectional lateral view of a self heating receptacle.
Figure 5:
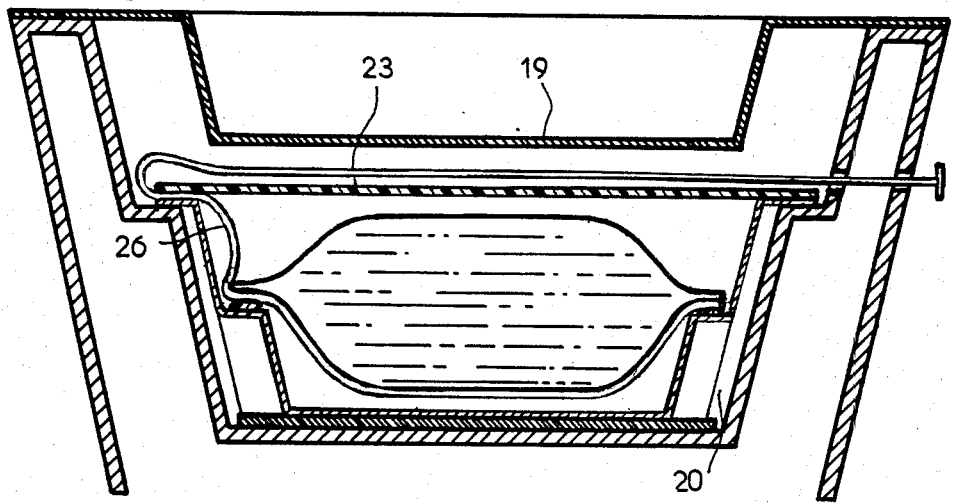
FIG. 5 is a lateral cross sectional view of the self heating receptacle.

According to another embodiment, illustrated in FIGS. 4 and 5, the self heating receptacle can be of a disposable type. A support member 18 includes one or a plurality of food vessels 19 having a chamber for the disposition of food products. A container or heating receptacle 20 disposed below the food vessel chambers 19 carries the reactive chemical products calcium oxide 21 and a reservoir of water in pouch 22. The container or heating vessel 20 which carries the reactive products 21 and 22 is closed hermetically, by an impermeable lid 23.

In to that embodiment, the food vessel 19 can be 80 microns or more in thickness, but it is separated from the heating receptacle 20 by a void of 5 mm or there abouts. The lid 23 of the heating vessel 20 may be up to 40 microns in thickness. During and after the reaction the lid rests above the heating vessel 20. By pulling a cord the lid 23 is cut along its center in the longitudinal direction, to allow the escape of the vapor which will heat the food vessel 19.

Figure 6:
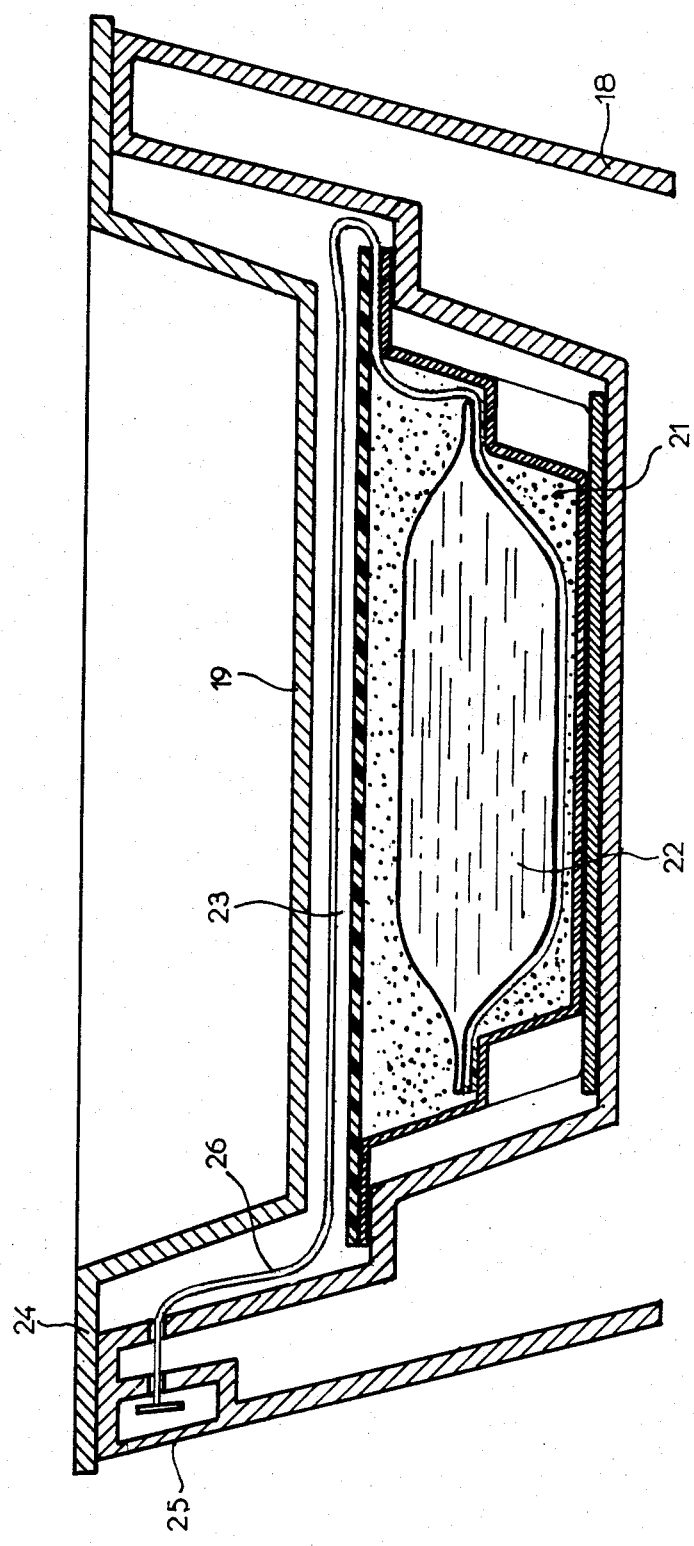
FIG. 6 is a longitudinal cross sectional view of an another embodiment of the self heating receptacle.

Illustrated in FIG. 6 is a means for opening 24 and setting off the chemical reaction. A protective window 25 is disposed on the side of the support member 18, and inside the window 25 is disposed a cord 26 which is connected to the pouch 22 containing the water, so that upon pulling on the means of opening 24, the water pouch 22 is ruptured thereby creating the chemical reaction.

The water pouch 22 could equally be provided with a valve which permits a measured flow of water thereby controlling the chemical reaction and thus the heat provided. The valve can be connected to the cord 26 so that by pulling the cord the valve can be opened.

The roll or pouch or container of water 22 can be made of a number of materials which assure a perfect seal. Those materials should offer a totally impermeable barrier against risks of leaks, perspiration or humidity.

One can therefore utilize a polypropylene film—special polyethylene, certain polyethylenes with elevated or average density, the complexes of polyester and polyethylene or polyethylene and polypropylene.

In certain cases, it may be desirable to conserve the self heating receptacles in a freezer in order to have the food products frozen. In order to prevent the water pouches from icing, or splitting as a result of expansion of the water turned to ice, it is useful to add to the water a product which lowers the freezing point, such as alcohol or methylated spirits.

For the products which are frozen, the heating vessel according to the present invention comprises various means and techniques in addition, which facilitates the heating of frozen products. Thus, in addition to the fact that the water within the pouch is mixed with an antifreezing agent, sufficient to obtain a temperature of −40° centigrade without changing phase (i.e. solidifying), as is already described in the quick lime should be packaged below the food vessel 19 to provide a space or void, and it should be protected from the contact with the aluminum by an evelope or lid 23 of polystyrene or some other material or compound that does not freeze and/or absorbs in such a way that, at the moment of defrosting the foods and during all the time necessary for that operation, the leaking of the frost which will be formed in the interior of the heating vessel does not trigger the premature reaction of the quick lime.

Figure 7:
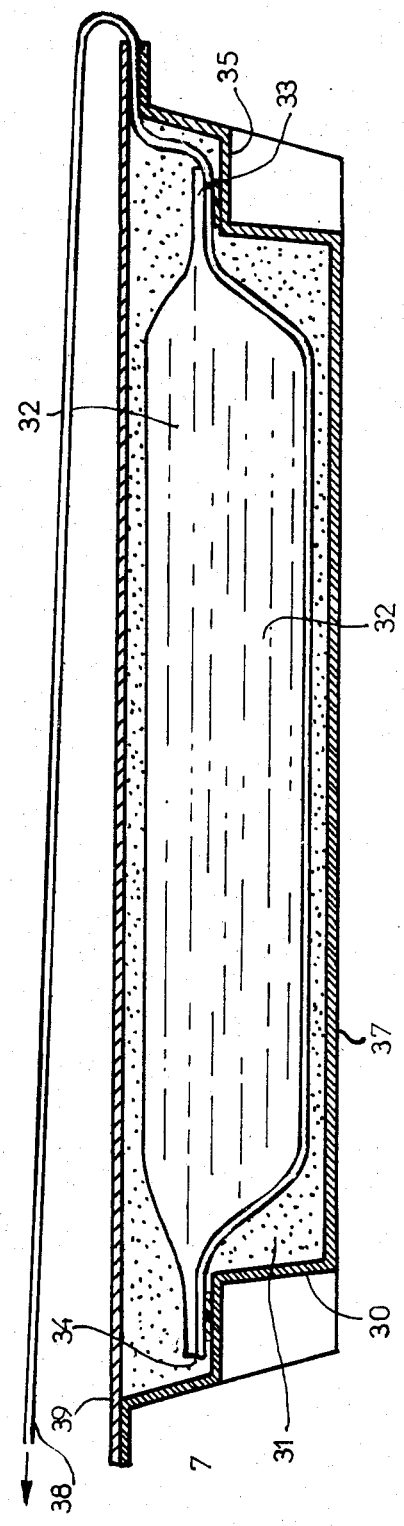
FIG. 7 is a longitudinal cross sectional view of a throw away self-heating receptacle.

Illustrated in FIG. 7 is heating vessel 30 having quick lime 31 and a torus or pouch of water 32. The pouch of water 32 is suspended by its extremities 33 and 34, which rest on a cushion 35 and 36, above the bottom 37 of the heating vessel 30. At the extremity 33 of the pouch 32 is a fixed a rip cord 38. The cord 38 passes (as shown in FIG. 7) under a safety lid 39. The rip cord 38 could equally be disposed as shown in FIG. 6.

Thus the ripcord 38, according to the invention, is bound and fixed against one of the extremities of the water pouch, e.g. 33, later it passes in between the upper portion of the water pouch 32 and the lower portion of the lid 39, later in between the upper portion of the lid 39 and the bottom 47 of the food vessel. Said cord 38 forms an S or a U, that, initially tears the security lid 39, and simultaneously opens the water pouch 32.

Figure 8:
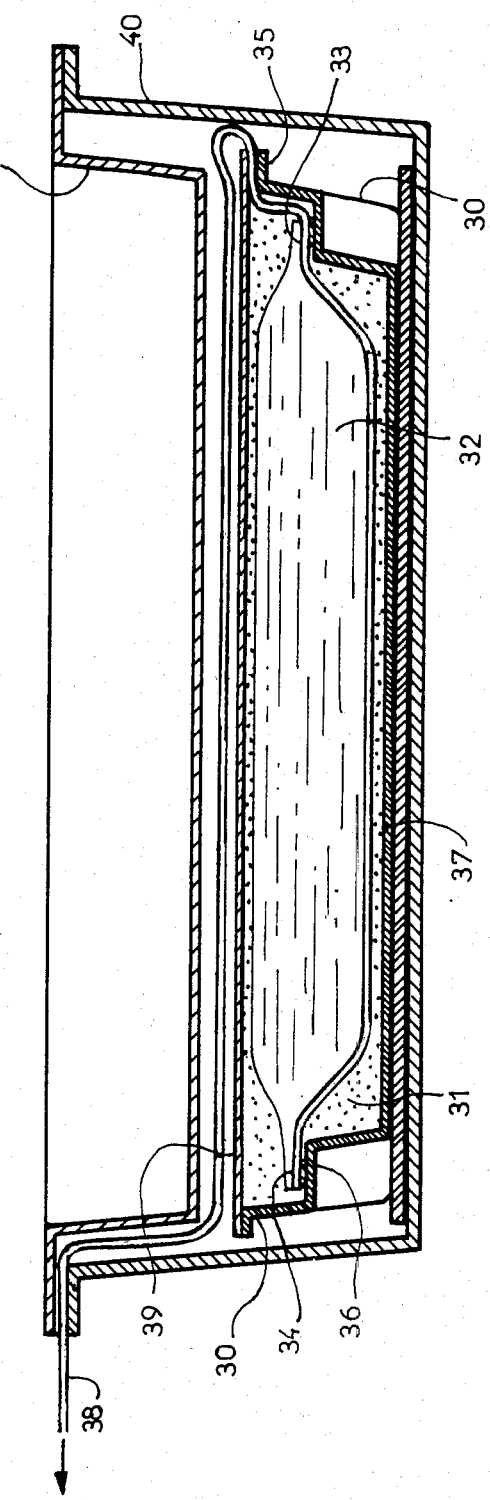
FIG. 8 is a cross sectional longitudinal view of an assembly of the vessel support and the protection provided by the vessel for heat and the vessel for food.

FIGS. 7 and 8 illustrate the double function of the rip cord 38, which serves not only to open the pouch 32 but also to simultaneously open the lid 39.

In FIG. 7 the rip cord 38 passes under the lower wall, and under the extremity 34 between the extremity 34 and the cushion 36 and the point of fixation to the pouch.

In FIG. 8, the rip cord 38 is attached to the extremity 33 of the water pouch 32, passes above the upper part of the water pouch 32 and in betwen the lower wall of the lid 39, it goes against the interior wall of the protection vessel, or vessel support 40 and comes out again at the brim of the food vessel 41. FIG. 8 also shows the support, or protection vessel 40 which functions as a support or chamber for the heating vessel 30 and also for the food vessel 41.

FIG. 9 represents another embodiment of the self heating receptacle, including a cover 42. The cover 42 is made of two parts 43 and 44. Space is provided between parts 43 and 44 to serve as a chamber for hot vapors from the heating vessel 30. The cover 42 is provided with small conduits or chimneys 45 which are disposed in communication with a chamber 46 formed by the bottom 47 of the food carrying vessel 41 and the lid 39 or the chamber of the heating vessel 30. When the cord 38 is pulled, the cord exerts a force on the extremity 33 of the pouch 32, thereby rupturing the pouch. At the same time the cord tears or peels away the lid 39 on the heating vessel 30. The piercing, or removal of the lid 39 allows the steam to enter into the void between the lid and the bottom 47 of the food vessel 41. The steam also enters the chamber 46 and rises through conduits 45 into the space between the parts 43 and 44 of the cover 42. In this fashion heat is provided on all surfaces of the receptacle.

In certain Scandavian countries, where temperatures can reach −15° or −20° centrigrade, it is difficult when using a conventional receptacle to reheat the food conveniently. The foods at the bottom will be warm and those at the top will be cold. The cover 43 can be made of two walls, the exterior in polypropylene and the interior is polypropylene fused on aluminum. In between the two is a void, which is in communication with the small conduits or chimneys 45 which in turn is in communication with the heating chamber 46 of the vessel. The vapor passes also in the cover and reheats in a manner equally and sufficiently all of the food in the food carrying vessel or container.

The water pouch 32 may flanked lengthwise at the center of the interior wall, by a projection, (see FIG. 1), or a ripcord 38 of a predetermined length in relation to the dimensions of the water pouch 32, the heating vessel 30, and the method of opening that is chosen. If a ripcord 38 is used it can be glued, heat sealed or fixed to the pouch 32. The material of the ripcord 38 can vary with the material of the pouch 32, and also the water tight lid 39. The material should permit ripcord 38 to form a perfect seal without having the adherence to the lid 39. The ripcord 38 should have a sufficient length to return from behind and exit on the support or protection vessel 40 through the chamber 46 especially designed in its position and diameter so that it can serve equally as a chimney or conduit for the venting of the vapor. The conduits 45 may be sealed or stopped up while in storage.

The ripcord 38 is glued, firmly attached or fixed to the exterior of the roll or pouch 32. The position of the ripcord 38 is practical in such a way that in pulling on said cord, it splays the center of the pouch 32 and the lid 39. Thus, withdrawal of reactive material, due to the friction exercised by the cord 38, permits the water pouch, to irrigate regularly, totally, and rapidly, the space left between the bottom of pouch 32 resting on its pads 35 and 36 and the bottom of the heating vessel 30, because the water pouch is suspended by its extremities 33 and 34 on the bottom of the heating vessel 30. That operation permits, because of the cutting of the lid, the vapor created by the exothermic reaction escape, and thereby heat the foods contained inside the upper vessel without diminishing the safety due to the thickness of the lid which rests in place.

The cover 43 has three principal functions:

(a) To protect the foods and to prevent spillage;
(b) It can serve as a dish to heat, or as a board for cutting; and
(c) It can serve equally in certain cases as an oven.

It will thus be seen that the objects set forth above, among those made apparent from the preceeding description, are efficiently attained, and, since certain changes may be made in the constructions set forth without departing from the scope of the invention, it is intended that all matter contained in the above description, or shown in the accompanying drawings, shall be interpreted as illustrated and not in a limiting sense.

I claim:

1. In a self heating receptacle of the type having a food vessel for foods and at least two chemicals disposed adjacent to said food vessel that can react exothermically, the improvement comprising:

a pouch containing one of said at least two chemicals;

a drawer containing said pouch, said food vessel including an opening therein for accepting said drawer;

a guiding ramp disposed on the side of said drawer;

cutting means disposed inside of said opening for opening said pouch to permit said two chemicals to produce an exothermic reaction; and roller means operatively connected to said cutting means for engaging said guiding ramp whereby upon the engaging of the guiding ramp on said roller means said cutting means moves toward the pouch to open said pouch thereby setting off an exothermic reaction.

2. The improved self heating receptacle of claim 1 further comprising means disposed in said pouch for lowering the freezing temperature of the chemical in said pouch.

3. The self heating receptacle of claim 1 wherein said pouch comprises a roll having a central compartment containing water and a peripheral compartment containing a chemical which reacts exothermically with water.

* * * * *